United States Patent [19]

White

[11] Patent Number: 5,016,719
[45] Date of Patent: May 21, 1991

[54] ROTARY CONE TYPE ROCK BITS

[75] Inventor: Kenneth M. White, Calgary, Canada

[73] Assignee: Western Rock Bit Company Limited, Calgary, Canada

[21] Appl. No.: 469,356

[22] Filed: Jan. 24, 1990

[51] Int. Cl.⁵ .............................................. E21B 10/22
[52] U.S. Cl. .................... 175/353; 175/359; 175/371; 175/372
[58] Field of Search ............... 175/331, 341, 350, 353, 175/359, 367, 368, 369, 371, 372, 356, 329, 357

[56] References Cited

U.S. PATENT DOCUMENTS

| | | | |
|---|---|---|---|
| 1,792,604 | 2/1931 | Reed | 175/372 |
| 4,172,502 | 10/1979 | van Nederveen | 175/372 |
| 4,753,303 | 6/1988 | Burr | 175/359 |
| 4,753,304 | 6/1988 | Kelly, Jr. | 175/371 |
| 4,765,205 | 8/1988 | Higdon | 175/371 |

FOREIGN PATENT DOCUMENTS

| | | |
|---|---|---|
| 0932318 | 8/1973 | Canada . |
| 0975748 | 10/1975 | Canada . |
| 1039266 | 9/1978 | Canada . |
| 1041476 | 10/1978 | Canada . |
| 1048489 | 2/1979 | Canada . |
| 1051864 | 4/1979 | Canada . |
| 1059984 | 8/1979 | Canada . |
| 1081206 | 7/1980 | Canada . |
| 1104552 | 7/1981 | Canada . |
| 1127627 | 7/1982 | Canada . |
| 1151639 | 8/1983 | Canada . |
| 1164448 | 3/1984 | Canada . |
| 1182105 | 2/1985 | Canada . |
| 1157463 | 11/1985 | Canada . |
| 1209570 | 8/1986 | Canada . |
| 1210752 | 9/1986 | Canada . |
| 1227789 | 10/1987 | Canada . |
| 1231091 | 1/1988 | Canada . |
| 1235113 | 4/1988 | Canada . |
| 1237424 | 5/1988 | Canada . |

Primary Examiner—Bruce M. Kisliuk
Attorney, Agent, or Firm—Dressler, Goldsmith, Shore, Sutker & Milnamow, Ltd.

[57] ABSTRACT

An earth boring bit of the type having three rotary cone cutters carried on bearing pins depending from respective head sections is disclosed. Adjacent the rear face of a cutter is located a portion of the respective head section commonly known as the shirttail. The invention discourages the intrusion of cuttings into the bearing surfaces or seals and reduces the likelihood of fracture of the shirttail. This is achieved by forming the coacting faces as truncated conical surfaces instead of the usual configuration of the prior art which is arranged substantially perpendicular to the bearing pin axis.

8 Claims, 3 Drawing Sheets

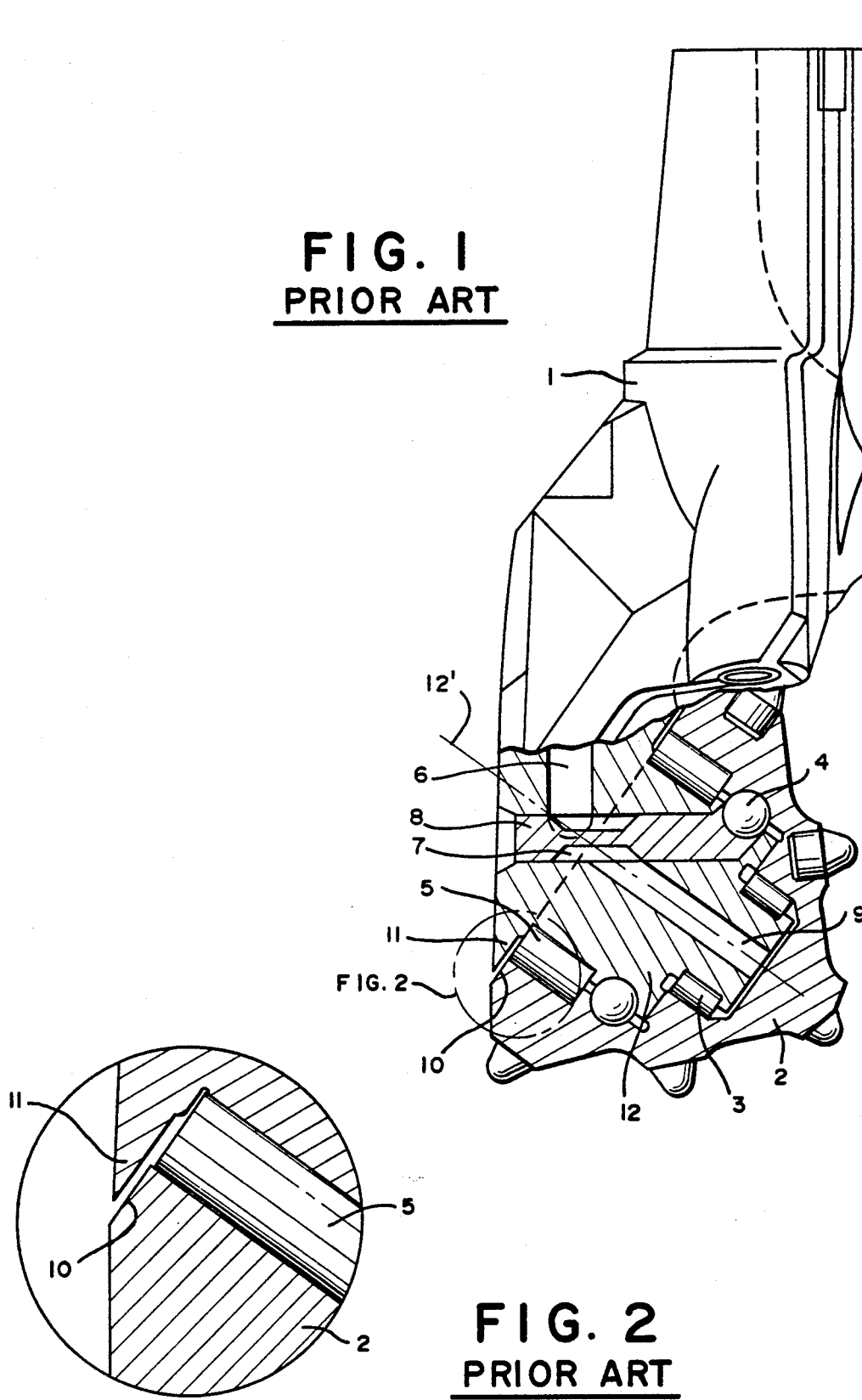

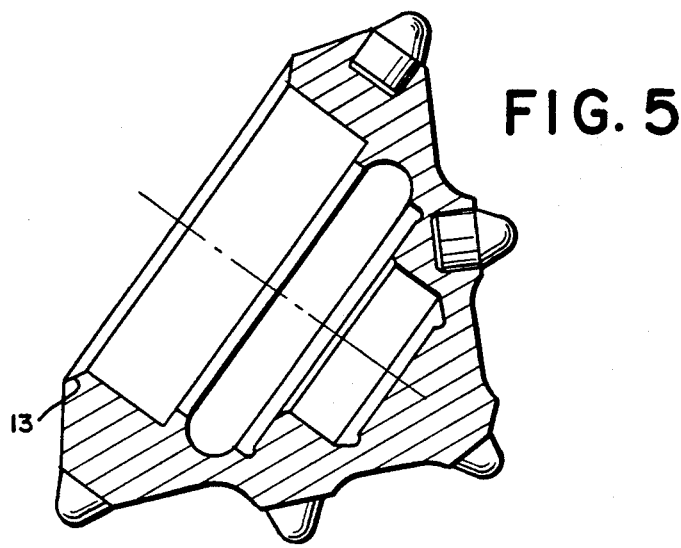
FIG. 5
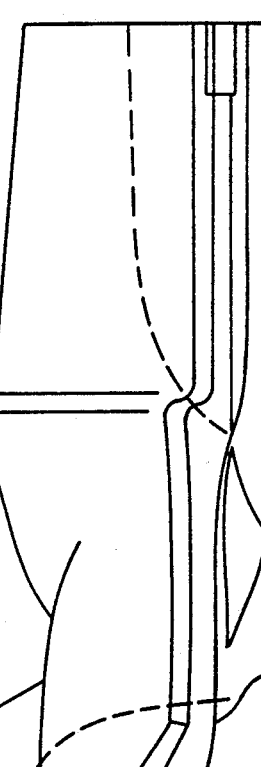
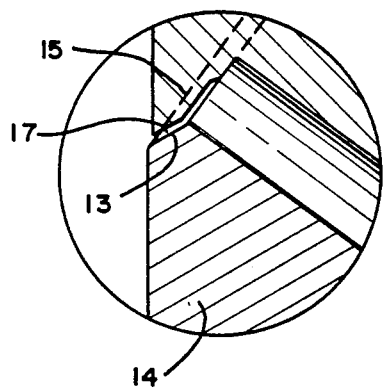
FIG. 4
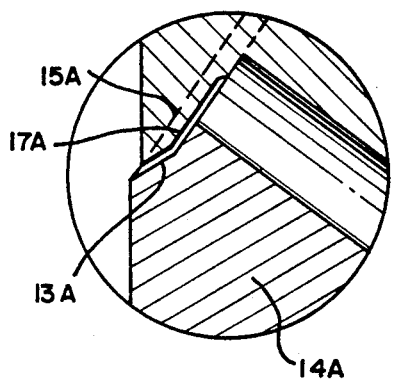
FIG. 4A
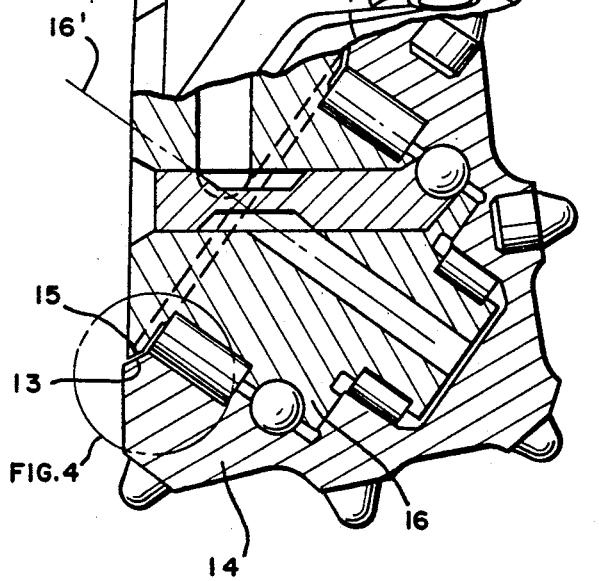
FIG. 3

ROTARY CONE TYPE ROCK BITS

BACKGROUND OF THE INVENTION

This invention relates to an improved means of extending the life of rotary cone type drill bits.

Prior art drill bits of this type as would be used in mining blast hole drilling, having gaseous circulation fluid, or oilfield rotary drill bits have in common a transition surface normally referred to as the shirttail.

The shirttail is the area of the drill bit head section that transitions the head section to the gauge surface of the cone. Failure of this surface due to abrasion and/or fracture exposes the bearing surfaces or seal to the drill cuttings and rapid failure of the bit occurs. Prior art drill bits are characterized by the back face of the cone, i.e. the transition surface, forming a true 90 degree surface to the center-line of the drill bit bearing pin. Since the innermost surface of the shirttail is parallel to this surface of the cone it also forms a true 90 degree surface to the center-line of the bearing pin.

An object of this invention is to extend the life of rotary cone type drill bits by providing an effective means of protecting the shirttail area of the head sections such that premature exposure of the seals and or bearing surfaces is prevented.

SUMMARY OF THE INVENTION

According to one aspect, the present invention provides an earth boring bit of the type having three head sections joined together, each head section having a bearing pin and shirttail, the bearing pin carrying on its rotary axis a rotatably mounted, generally conical cutter having a rear surface juxtaposed to the shirttail, the shirttail having a surface extending to the radially outermost portion of the shirttail, which surface is complementary in shape to the rear surface of the conical cutter and defines with the rear surface a clearance, at least the radially outermost portion of the rear surface being formed as a female truncated conical surface defined by major and minor diameters perpendicular to the rotary axis, whereby the truncated conical surface partially encloses the shirttail.

BRIEF DESCRIPTION OF THE DRAWINGS

FIG. 1 is a partial longitudinal cross-section of one head section on a conventional prior art type rotary cone drill bit;

FIG. 2 is an expanded view of the shirttail area of the prior art head section of FIG. 1;

FIG. 3 is an equivalent head section view of FIG. 1 of the improved configuration according to the invention;

FIG. 4 is an expanded view of the shirttail area of the inventive head section of FIG. 3;

FIG. 4A is a view similar to FIG. 4 but showing an alternate cone configuration;

FIG. 5 is a center-line section of a roller bearing type cone showing the inventive conical transition surface;

DESCRIPTION OF THE PREFERRED EMBODIMENTS

Figure 9:
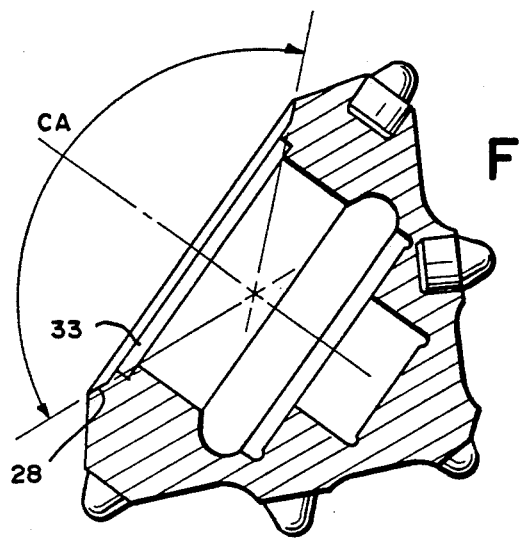
FIG. 9 is a center-line cross-section of a journal bearing type cone showing the inventive conical transition surface.

The prior art head section cone assembly shown in FIG. 1 is of a typical configuration as would be used in a drill bit assembly having compressed gas or air for a bearing coolant, lubricant. The lead section is one of three making up the bit assembly. A generally conical rotary cutter or cone has nose rollers 3, retaining balls 4, and main rollers 5 designed to resist the drilling loads. Compressed air or gas is supplied through passage 6 by the relief area 7 in the ball retainer 8 and through the passage 9 to cool and lubricate the bearing elements. Cone 2 has a typical annular runout surface 10 in the shirttail area 11 of the head section 1. This surface forms a plane at 90 degrees to the center-line 12' of the bearing pin 12 on which the cone is rotatably mounted.

FIG. 2 shows a blow-up of the critical area with corresponding elements marked. As can be seen the shirttail is of comparatively slender configuration and is exposed directly to the drill cuttings that precede the head section as it rotates during drilling. Characteristic failure of the shirttail is due to cuttings being forced into the clearance space between surface 10 and the shirttail which causes abrasive wear. Due to the limited clearance space available straight impact of the shirttail with the wall of the drill hole often causes a chipping type of fracture in this area.

The preferred configuration according to the invention is generally illustrated in FIG. 3. Transition surface 13 on cone 14 is angled relative to the center-line 16' of the bearing pin 16 in such a manner that the surface of revolution generated is a truncated cone about the center-line of the bearing pin.

The blow-up view of FIG. 4 more clearly details the critical surfaces of FIG. 3. It is shown here that a portion of the cone 14 covers the shirttail on the head section in such a manner that during drilling the clearance space 17 between the shirttail 15 and the cone surface 13 is not directly exposed to the drill cuttings. Since the shirttail area is protected on its leading edge by the cone the incidence of abrasive failure of the shirttail is greatly reduced. FIG. 3 also shows that the shirttail is substantially more rugged and not as susceptible to impact fracture as would a drill bit shirttail according to FIG. 2.

FIG. 5 shows a center-line section through a roller bearing type cone that has the truncated conical transition surface. Due to space limitations this type of cone would normally have the minor diameter runout of the conical surface substantially equal to the diameter of the main roller race. It is evident that a sacrifice in main roller bearing length would allow for an even greater overlap of the shirttail in this type of bearing configuration.

Figure 6:
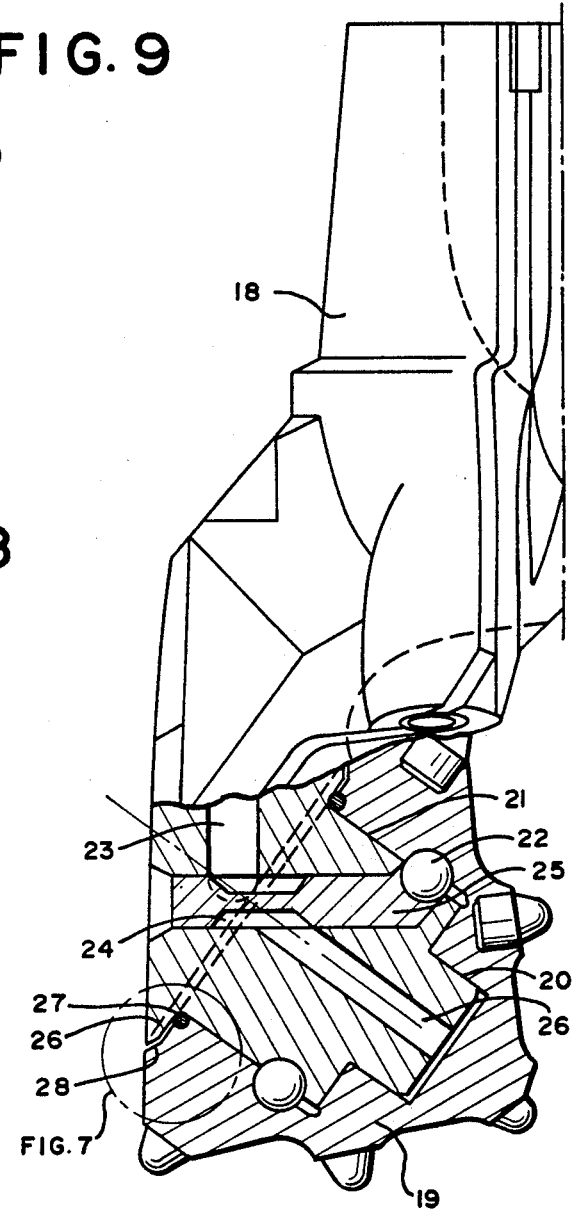
FIG. 6 is a partial longitudinal cross-section of one head of a journal bearing type drill bit.

The head section shown in FIG. 6 is commonly used in oilfield drilling applications. Journal bearing drill bits have nearly replaced the once more common ball and roller type bits in all oilfield applications. Wear on the shirttail area of these bits is not as common as in air drilling operations but shirttail fracture is more common. The shirttail area of presently available oilfield bits is similar to the prior art drawing of FIG. 1. The inventive configuration of FIG. 6 has a head section 18, cone 19, journal bearing surfaces 20, 21, retained balls 22, as are commonly found. This type of bearing uses a grease or oil type lubricant which is supplied through passage 23, along and by relief area 24 on the ball retained plug 25. Passage 26 is typical to supply lubricant to the nose journal and associated thrust faces. Seal 27 is of an "O" ring type and is provided to prevent foreign material from entering the bearing surfaces and lubricant from escaping. Since the load carrying capacity of a journal type bearing is much greater than a dimensionally equivalent roller bearing, journal bearing bits generally have thicker cone shells and the main journal bearing surface in the cone can be made smaller with no loss of bearing capacity. The conical transition surface in this case can then be as is shown in FIG. 7.

Figure 7:
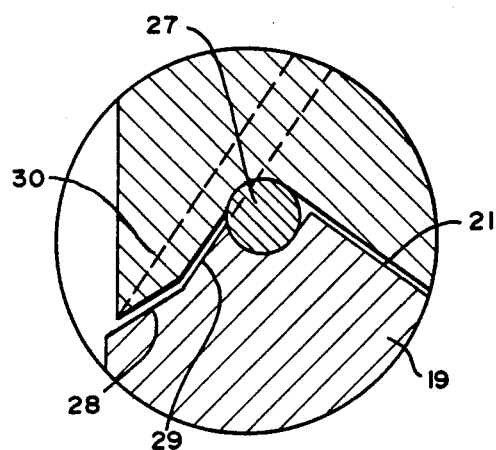
FIG. 7 is an expanded view of the shirttail area of FIG. 6.

The conical transition surface 28 of FIG. 7 has a minor diameter that is greater than the main journal bearing diameter and the seal recess diameter and a portion of the surface would be annular as is the prior art type bit at 29. Since there is still provided a conical transition surface the shirttail 30 is effectively protected from abrasive wear.

In a similar manner, the embodiment of FIG. 4 could be modified as shown in FIG. 4A by making the minor diameter greater than that of the main roller race such that a portion of the rear surface adjacent the main roller race is annular.

Figure 8:
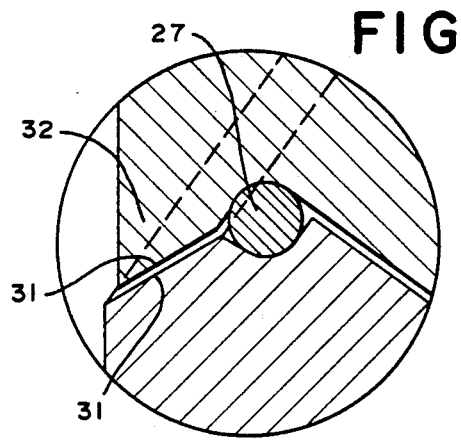
FIG. 8 is an alternate type of shirttail cone configuration of FIG. 6.

FIG. 8 shows a modification wherein the maximum protection for the shirttail is generated by having the minor diameter of the conical transition surface 31 terminate at the seal recess. It can be seen here that the shirttail 32 is more rugged and somewhat shorter than the configuration of FIG. 7. Shirttails of the configuration of FIG. 8 generally do not fail due to abrasion or impact.

The center-line cross-section shown in FIG. 9 is of an oilfield type cone having the features previously disclosed. The conical transition surface 28 in this view is of the type shown in FIG. 7. The "O" ring seal recess is shown at 33 and is of a conventional configuration.

It has been found that the total conical angle CA formed by the transition surface should be between 60 and 150 degrees. Various configurations of this surface have been examined such as arcuate, parabolic and elliptical and though practical and within the scope of this invention were found not to offer significant performance increases to warrant the increased manufacturing costs involved.

I claim:

1. An earth boring bit of the type having three head sections joined together, each head section having a bearing pin and shirttail, the bearing pin carrying on its rotary axis a rotatably mounted, generally conical cutter having a rear surface juxtaposed to the shirttail, the shirttail having a surface extending to the radially outermost portion of the shirttail, which surface is complementary in shape to the rear surface of the conical cutter and defines with the rear surface a clearance, at least the radially outermost portion of the rear surface being formed as a female truncated conical surface defined by major and minor diameters perpendicular to the rotary axis, whereby the truncated conical surface partially encloses the shirttail.

2. An earth boring bit according to claim 1 in which each conical cutter is rotatably mounted on its respective bearing pin by means of bearings comprising at least a main roller race and complementary rollers, the minor diameter of the truncated conical surface being substantially equal to the outside diameter of the main roller race, whereby the portion of the rear surface of the conical cutter which is radially outward of the main roller race is formed as the female truncated conical surface.

3. An earth boring bit according to claim 1 in which each conical cutter is rotatably mounted on its respective bearing pin by means of bearings comprising at least a main roller race and complementary rollers, the minor diameter of the truncated conical surface being greater than the outside diameter of the main roller race, whereby the portion of the rear surface of the conical cutter adjacent the main roller race is formed as an annular surface and the portion of the rear surface of the conical cutter which is radially outward of the annular surface is formed as the female truncated conical surface.

4. An earth boring bit according to claim 1 in which each conical cutter is rotatably mounted on its respective bearing pin by means of bearings comprising at least one main journal bearing surface on the bearing pin and a complementary main journal bearing surface on the cutter and a seal recess is provided in the cutter at the junction of the main journal bearing surface of the cutter and the rear face of the cutter, the minor diameter of the truncated conical surface being substantially equal to the outside diameter of the main roller race, whereby the portion of the rear surface of the conical cutter which is radially outward of the seal recess is formed as the female truncated conical surface.

5. An earth boring bit according to claim 1 in which each conical cutter is rotatably mounted on its respective bearing pin by means of bearings comprising at least one main journal bearing surface on the bearing pin and a complementary main journal bearing surface on the cutter and a seal recess is provided in he cutter at the junction of the main journal bearing surface of the cutter and the rear face of the cutter, the minor diameter of the truncated conical surface being greater than the outside diameter of the seal recess whereby the portion of the rear surface of the conical cutter adjacent the seal recess is formed as an annular surface and the portion of the rear surface of the conical cutter which is radially outward of the annular surface is formed as the female truncated conical surface.

6. An earth boring bit of the type having three head sections joined together along a center line, each head section having a bearing pin and shirttail, the bearing pin carrying on its rotary axis a rotatably mounted, generally conical cutter having a rear surface juxtaposed to the shirttail, the shirttail having a surface extending to the radially outermost portion of the shirttail, which surface is complementary in shape to the rear surface of the conical cutter and defines with the rear surface a clearance, at least the radially outermost portion of the rear surface being formed as a female truncated conical surface defined by major and minor diameters perpendicular to the rotary axis, the major and minor diameters being so positioned and sized to form a total conical angle of 60 to 150 degrees, whereby the truncated conical surface partially encloses the shirttail.

7. An earth boring bit of the type having three head sections joined together, each head section having a bearing pin and shirttail, the bearing pin carrying on its rotary axis a rotatably mounted, generally conical cutter having a rear surface juxtaposed to the shirttail, at least the radially outermost portion of the rear surface being formed as a female truncated conical surface defined by major and minor diameters perpendicular to the rotary axis, whereby the truncated conical surface partially encloses the shirttail, and further wherein each said conical cutter is rotatably mounted on its respective bearing pin by means of bearings comprising at least a main roller race and complementary rollers, the minor diameter of the truncated conical surface being substantially equal to the outside diameter of the main roller race, whereby the portion of the rear surface of the conical cutter which is radially outward of the main roller race is formed as the female truncated conical surface.

8. An earth boring bit of the type having three head sections joined together, each head section having a bearing pin and shirttail, the bearing pin carrying on its rotary axis a rotatably mounted, generally conical cutter having a rear surface juxtaposed to the shirttail, at least the radially outermost portion of the rear surface being formed as a female truncated conical surface defined by major and minor diameters perpendicular to the rotary axis, whereby the truncated conical surface partially encloses the shirttail, each said conical cutter being rotatably mounted on its respective bearing pin by means of bearings comprising at least one main journal bearing surface on the bearing pin and a complementary main journal bearing surface on the cutter, a seal recess being provided in the cutter at the junction of the main journal bearing surface of the cutter and the rear face of the cutter, the minor diameter of the truncated conical surface being substantially equal to the outside diameter of the main roller race, whereby the portion of the rear surface of the conical cutter which is radial outward of the seal recess is formed as the female truncated conical surface.

* * * * *